United States Patent
Kraenzler et al.

(10) Patent No.: US 6,810,970 B1
(45) Date of Patent: Nov. 2, 2004

(54) HAND POWER TOOL

(75) Inventors: Ernst Kraenzler, Leinfelden-Echterdingen (DE); Gerd Berner, Stuttgart (DE); Monika Renner, Leinfelden-Echterdingen (DE); Joachim Mueller, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 641 days.

(21) Appl. No.: 09/639,324

(22) Filed: Aug. 16, 2000

(30) Foreign Application Priority Data

Aug. 20, 1999 (DE) .......................... 199 39 171

(51) Int. Cl.[7] .............................................. E21B 3/00
(52) U.S. Cl. ........................ 173/217; 173/48; 173/213
(58) Field of Search ........................ 173/217, 48, 213

(56) References Cited

U.S. PATENT DOCUMENTS

| 3,873,863 | A | * | 3/1975 | Pew | 173/217 |
|---|---|---|---|---|---|
| 4,066,136 | A | * | 1/1978 | Wanner et al. | 173/201 |
| 4,334,439 | A | * | 6/1982 | Kadymir | 173/50 |
| 4,549,823 | A | * | 10/1985 | Nichting | 384/537 |
| 4,601,591 | A | * | 7/1986 | Wright | 384/536 |
| 4,991,472 | A | * | 2/1991 | Hollingsworth | 173/93.5 |
| 5,501,531 | A | * | 3/1996 | Hamaekers | 384/536 |
| 5,791,789 | A | * | 8/1998 | Van Duyn et al. | 384/624 |
| 5,839,349 | A | * | 11/1998 | Volz | 384/536 |
| 5,885,006 | A | * | 3/1999 | Sheedy | 384/192 |
| 6,021,826 | A | * | 2/2000 | Daniell | 144/136.95 |
| 6,331,078 | B1 | * | 12/2001 | Van Duyn | 384/498 |

FOREIGN PATENT DOCUMENTS

DE          195 47 332 A1        6/1997

* cited by examiner

Primary Examiner—Scott A. Smith
Assistant Examiner—Gloria R. Weeks
(74) Attorney, Agent, or Firm—Michael J. Striker

(57) ABSTRACT

A hand power tool has housing, a motor arranged in the housing and having a drive shaft with two opposite ends, bearings each supporting one of the ends of the drive shaft in at least one component, an insert tool, a drive element through which the drive shaft is operatively connected with the insert tool, at least one of the bearings of the drive shaft being supported on the component over one part of its length in a radial direction through a sliding seat, and also being supported on the component over another part of its length in the radial direction through a synthetic plastic ring.

15 Claims, 9 Drawing Sheets

HAND POWER TOOL

BACKGROUND OF THE INVENTION

The present invention relates generally to hand power tools.

The German document DE 195 47 332 A1 discloses a hand power tool, in which a cylindrical housing is composed of two synthetic plastic housing shells with edges forming separation edges which together define a horizontal separation plane. The housing shells are connected with one another by screws. In the interior of the housing, an electric motor with an impeller is arranged, whose drive shaft is supported at its ends by ball bearings in the housing shells and fixedly connected with a bevel pinion for joint rotation. The pinion engages with a bevel plate wheel supported on a driven shaft and having a rotary axis extending perpendicular to the drive shaft.

The driven shaft has a bearing point which is remote from the tool and has a ring shaped sliding bearings inserted in a cylindrical bearing receptacle of a housing shell. Furthermore, the driven shaft has a bearing point which is close to the tool and has a sleeve-shaped bearing bushing with a needle bearing. An eccentric pin supported on the end of the driven shaft which is close to the tool extends through the bearing bushing from above into an opening of a connecting rod-type driver. The driver engages with a projection in a recess of an insert tool which is supported through a guiding bearing in a front region of the housing shells.

SUMMARY OF THE INVENTION

Accordingly, it is an object of present invention to provide a hand power tool which is a further improvement of the existing tools of this type.

The inventive hand power tool has a motor arranged in a housing and having a drive shaft which is supported with its ends via a corresponding bearing in at least one component, and is connected via a driver element with an insert tool by an operative connection.

In accordance with the present invention it is proposed that at least one bearing of the drive shaft is supported over a part of its length in a radial direction via a sliding seat directly on the component and through a part of its length in a radial direction via a synthetic plastic ring on the component, with preferably over ⅓ of its length via the sliding seat and over approximately ⅔ of its length via the synthetic plastic ring or a rubber ring. The drive shaft is reliably fixed by the sliding seat and in addition can be advantageously dampened via the rubber ring in its bearing point or vibrations or impacts can be compensated by the rubber ring. Furthermore, an outer ring of the bearing can compensate, through the synthetic plastic ring or rubber ring, the tolerances of the sliding seat, and fixed radially and non rotatably by clamping.

The synthetic plastic ring in accordance with the present invention is form-lockingly connected with the component at least opposite to its mounting connection, and in advantageous manner over the whole periphery. The synthetic plastic ring can be connected with the component in a particularly simple, cost-favorable manner without additional components, because of the form-locking connection. In particular in the hand power tools which are subjected to jerk-like movements, as for example during a so-called scraping and the like, it can be reliably avoided that the synthetic plastic ring is displaced in an axial direction from the component and thereby negatively affects the support.

The bearing is fixed in an axial direction preferably via a housing part, whereby additional components, mounting space, mounting expenses and cost can be saved. Holding elements can be formed simply and cost favorably on a screw dome of the housing which frequently extends in an interior of the housing. With the design provided with holding ribs, a cooling air stream can flow through the hand-power tool. By the form-locking connection of the synthetic plastic ring, it can be advantageously reliably fixed without extending the holding ribs over the whole periphery and negatively affecting the cooling stream.

The form-locking connection between the synthetic plastic ring and the component can be formed by different formations which are generally known for a person skilled in the art, for example by steps, zigs, waves, etc. In a simple and cost favorable manner, the form-locking connection can extend at least in one radial direction in a collar engaging in a recess, wherein the collar can be arranged on the synthetic plastic ring and/or on the component.

In accordance with a further embodiment of the invention, it is proposed that the synthetic plastic ring at least has an outer contour with a diameter increasing in mounting direction, and the housing part has a corresponding inner cone. Due to the cone, a desired form-locking connection can be provided in an axial direction and in addition, because of an axial force on the synthetic plastic ring, a radial force onto the bearing is applied, and thereby it is fixed especially secure by the synthetic plastic ring.

In order to avoid that the synthetic plastic ring can be mounted turnably, it is preferably formed symmetrically in an axial direction to its central plane, and the component has a corresponding symmetrical opposite surface. This can be achieved with a centrally arranged collar, or advantageously with a symmetrical double cone.

When the double cone in an axial direction has a diameter increasing to its central plane, the synthetic plastic ring during the mounting in an axial direction is automatically compressed in a radial direction so that the mounting can be simplified. The double cone on the synthetic plastic ring can be however formed with a diameter which also reduces in an axial direction to the central plane.

For preventing turning of the synthetic plastic ring in the component, it can be connected form-lockingly in a peripheral direction with the component. The connection can be formed for example by projections extending in the axial direction.

The component can be formed by an additional component which receives the bearing force, and is directly or indirectly supported in the housing. Preferably however, the component can be formed by a housing part, whereby additional components and mounting expenses can be saved. The bearing of the drive shaft is advantageously arranged in a cup-shaped recess. Various thermal expansions can be avoided by a different materials, and a tilting of the drive shaft can be avoided in this manner.

The inventive solution can be utilized in different hand power tools, for example a power drill, an angle grinder, etc., and especially advantageously with hand power tools which are subjected to jerk-like movements, such as scrapers, impact drill, impact screwdriver, etc.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
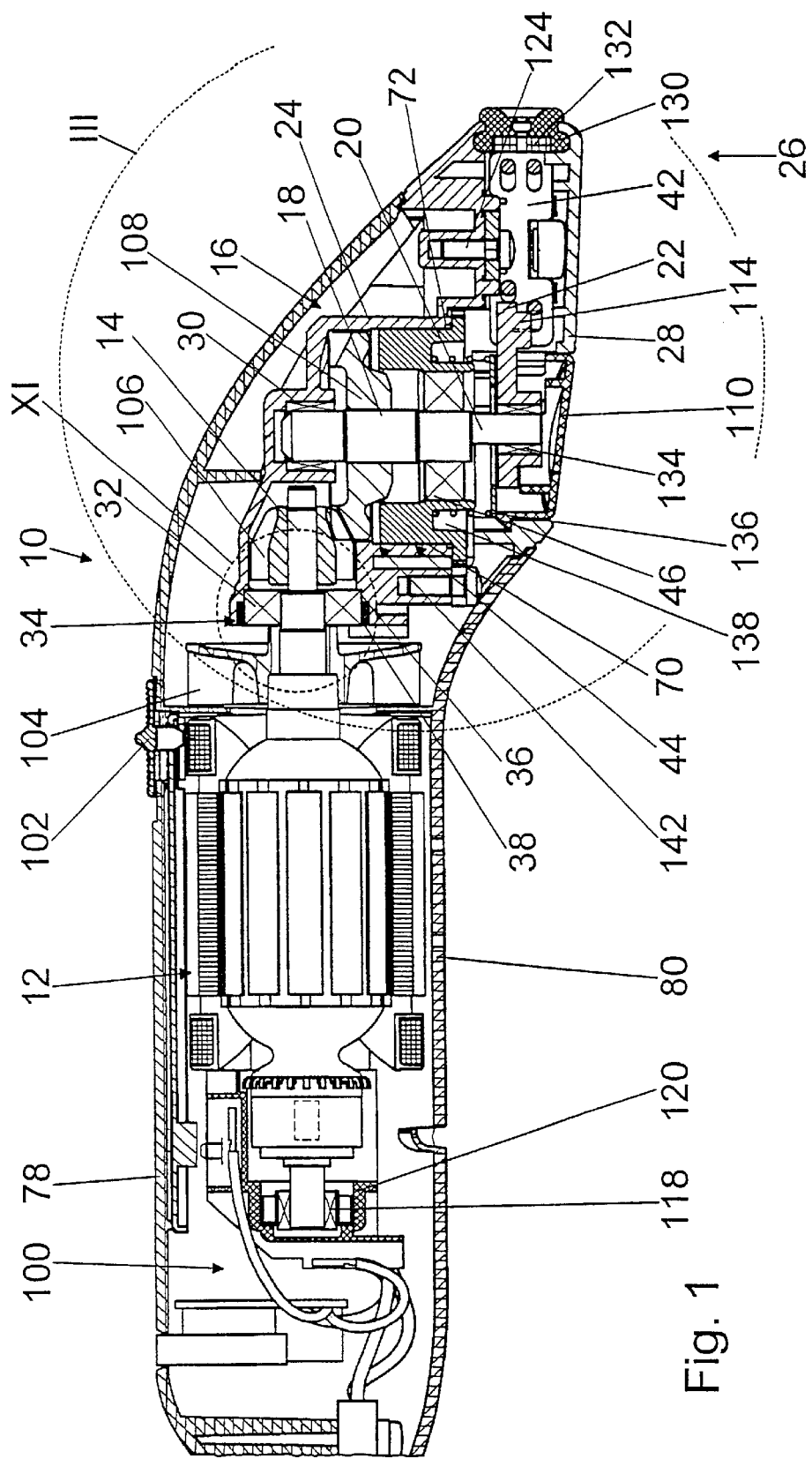
FIG. 1 is a view showing a longitudinal section through an inventive hand power tool.

FIG. 1 is a view showing a longitudinal section of an inventive hand power tool for scraping treatment of surfaces, shortly identified as a scraper. The hand power tool has a motor 12 which Is arranged in a housing 10. It is supplied with power through an electric cable 100 and switchable on and off by a switch 102. The electric motor 12 is operatively connected through a drive shaft 14 with an impeller 104 and with an angular transmission 16. A pinion 106 is mounted on the drive shaft 14 and engages with a ring gear 108 supported by a driven shaft 18 and having a rotary axis perpendicular to the drive shaft 14.

Figure 2:
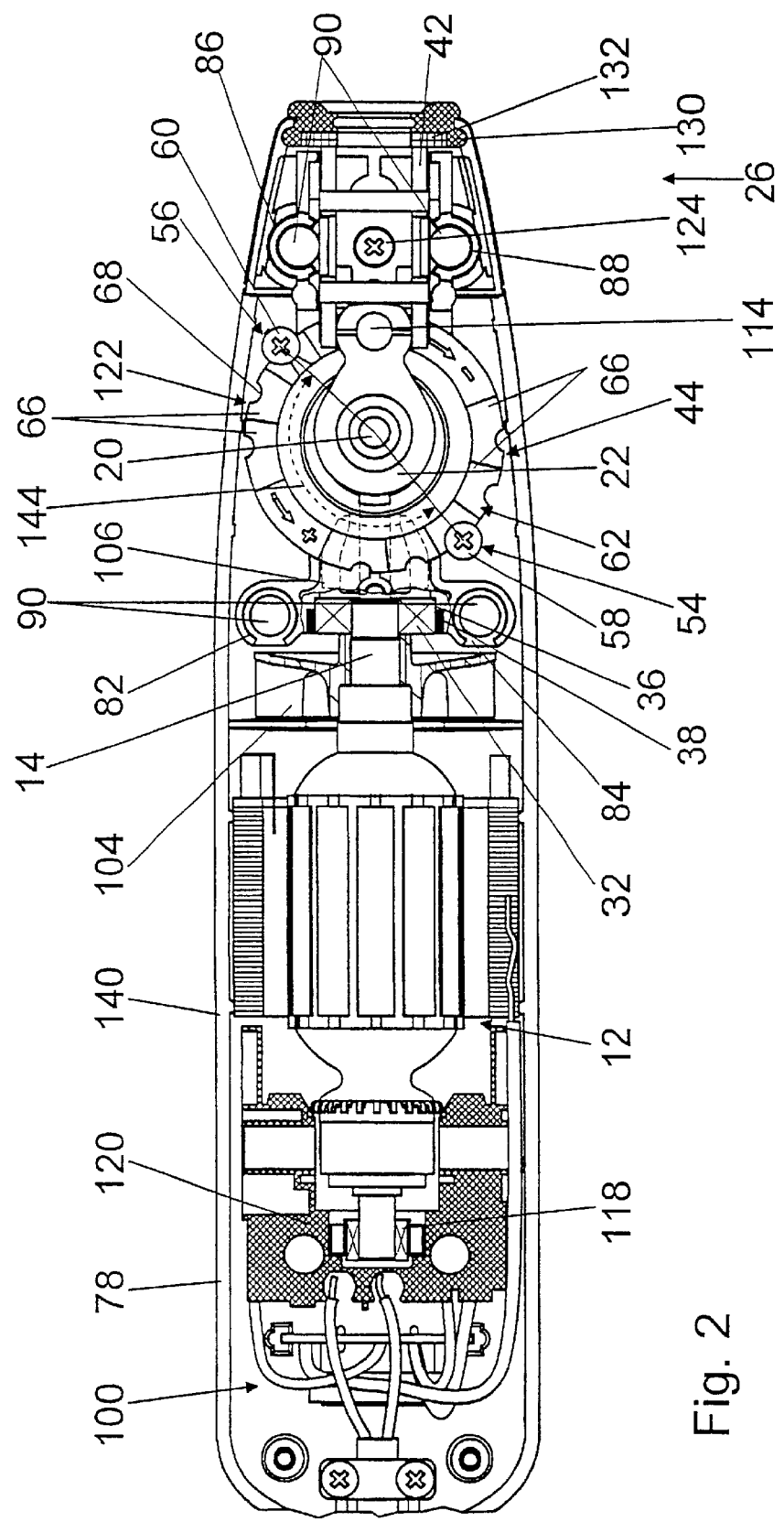
FIG. 2 is a view from below of an open hand power tool of FIG. 1.
Figure 3:
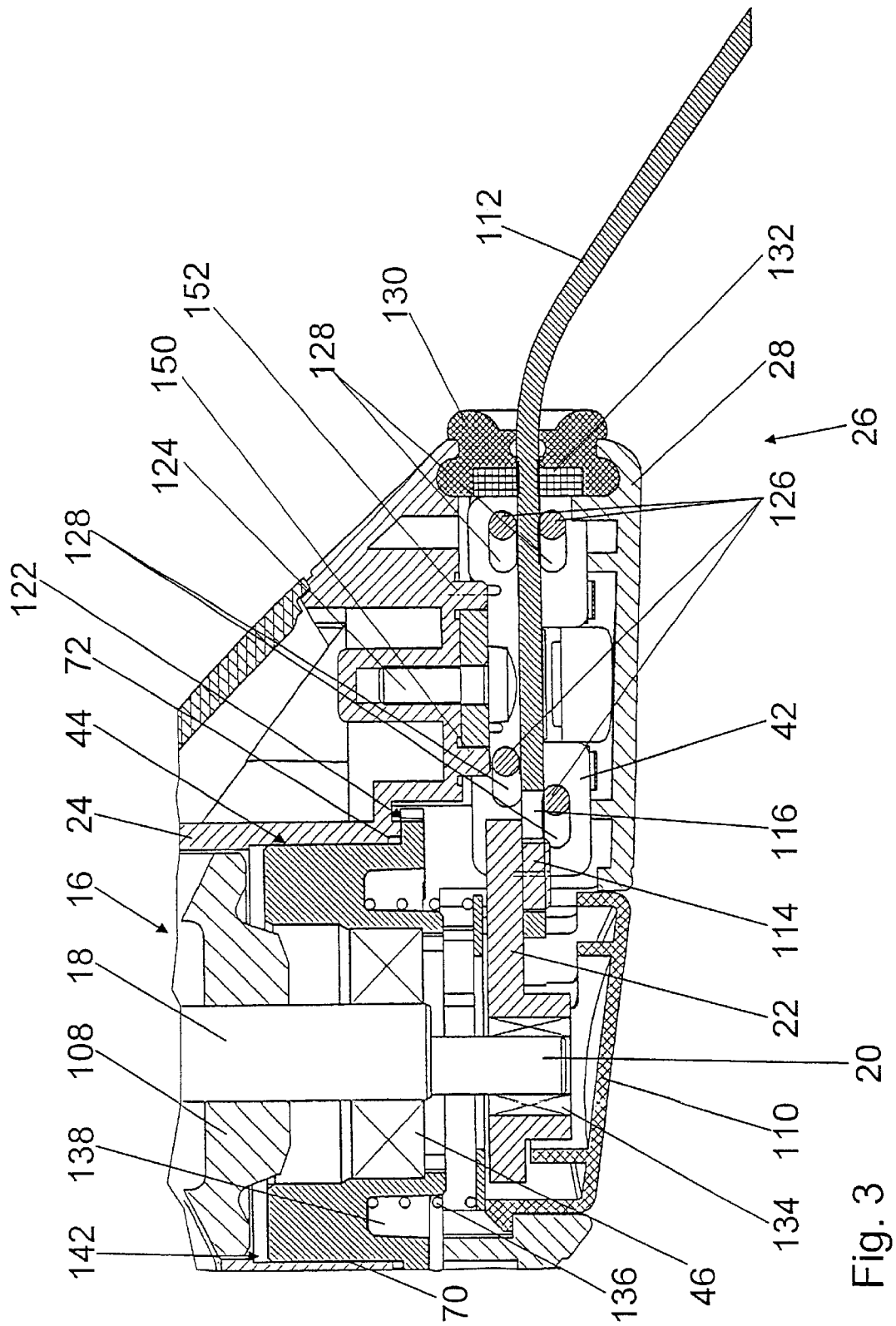
FIG. 3 is an enlarged portion III of FIG. 1, with a mounted insert tool.

An eccentric pin 20 is formed on the lower end of the drive shaft 18. It engages in a connecting rod-shaped driver element 22 and engages through a formed pin 114 in a longitudinal opening 116 of an insert 212 as shown in FIGS. 2 and 3. The eccentric pin 22 is supported through a roller bearing 134 in the driver element 22. Through the longitudinal opening 116, the movement transmission from the drive shaft 14 via the driver element 22 to the insert tool 112 is performed only when the insert tool 112 is set on a working surface and displaced back until the pin 114 abuts against the edge of the longitudinal opening 116 and therefore can transmit a reciprocating movement to the insert tool 112. During idle running the insert tool 112 does not move when the drive shaft 14 rotates, so that the wear of the movement-transmitting part can be reduced. Injuries during the idle running due to the moveable insert tool 112 are avoided. Furthermore, the immovable insert tool 112 during the idle running can be placed deliberately on a desired location on the surface to be treated.

The angular transmission 16 is arranged in a separate transmission housing 24 composed of aluminum pressure cast parts. In a front, upper region 26 it forms a first part of the housing 10 or the outer wall of the hand power tool, and with a cover 28 in a front, lower region 26 it forms a second part of the same.

Figure 4:
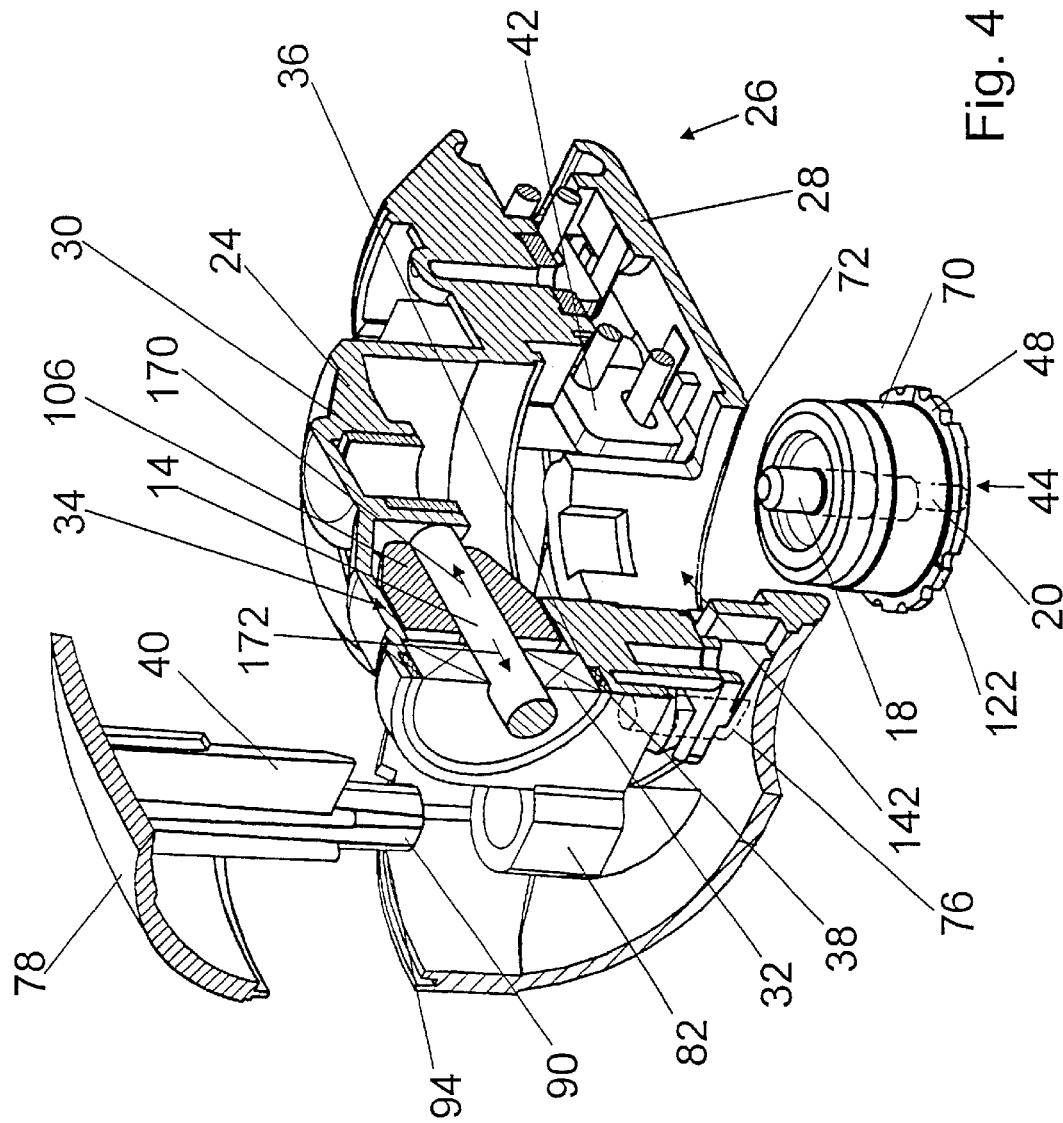
FIG. 4 is a view showing the section of the front region of the hand power tool of FIG. 1 before mounting of an upper housing shell.
Figure 5:
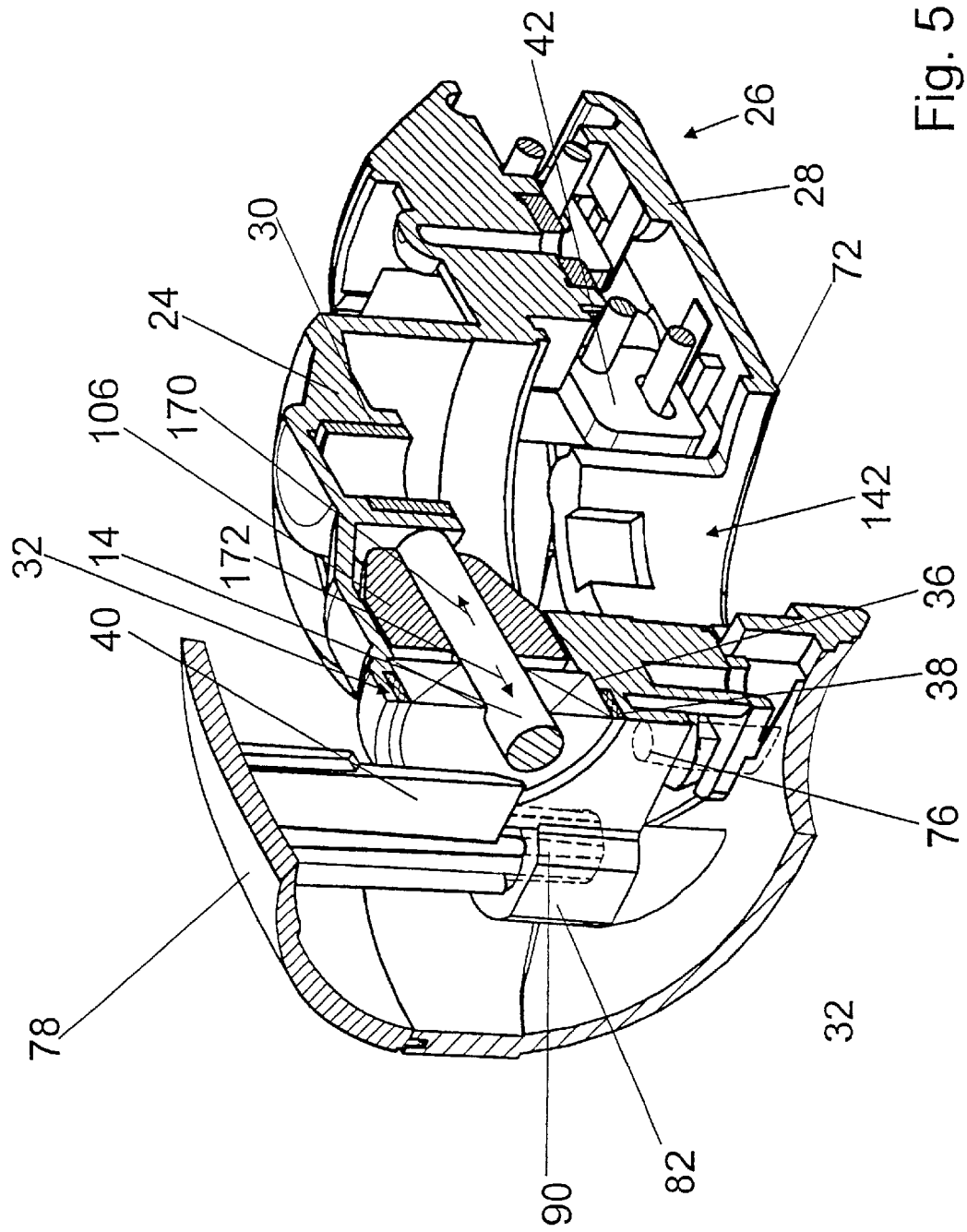
FIG. 5 is a cutout of the front region of FIG. 4 after the mounting of the upper housing shell.

Several bearing points are integrated in the transmission housing 24. A drive shaft 14 of the electric motor 12 on its first end facing away from the insert tool 112 is supported through a bearing 118 and through a component 120 in a first upper synthetic plastic housing shell 78. A second end of the drive shaft 14 which faces the insert tool 112 is supported through a bearing 32 in a cup-shaped recess 34 in the transmission housing 24. The bearing housing 32 is supported in a radial direction approximately over ⅓ of its length is supported via a sliding seat 36 directly in the housing transmission 24, and is supported over approximately ⅔ of its length in a radial direction via a rubber ring 38 in a transmission housing 24. In the axial direction 172, the bearing 32 is fixed through a holding rib 30 in the cup-shaped recess 34 which is formed In a screw dome of the upper housing shell 78. During the mounting it is displaced forwardly of the cup-shaped recess 34 as shown in FIGS. 4 and 5.

Figure 11:
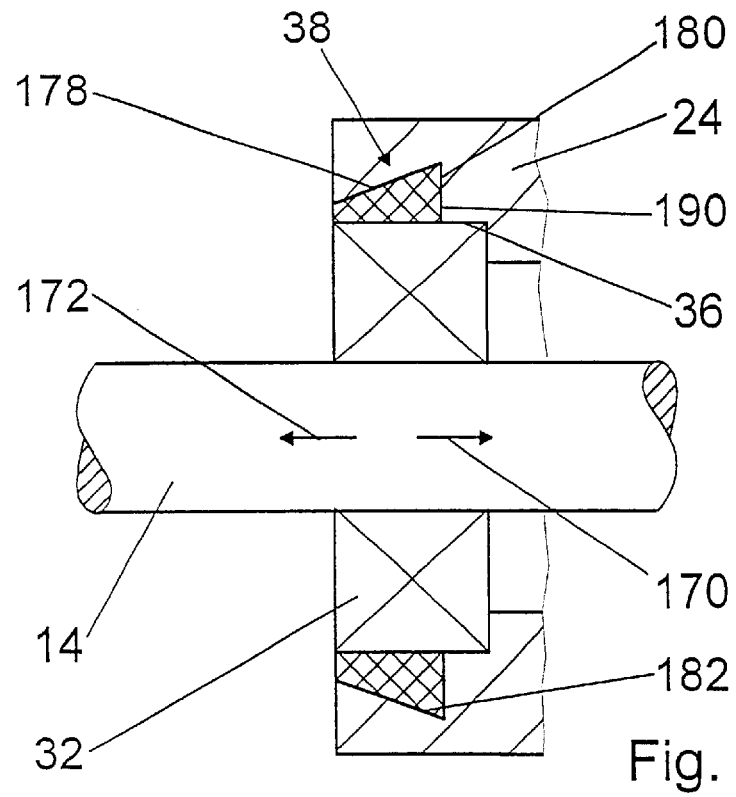
FIG. 11 is a view showing a portion XI of FIG. 1, on an enlarged scale.
Figure 12:
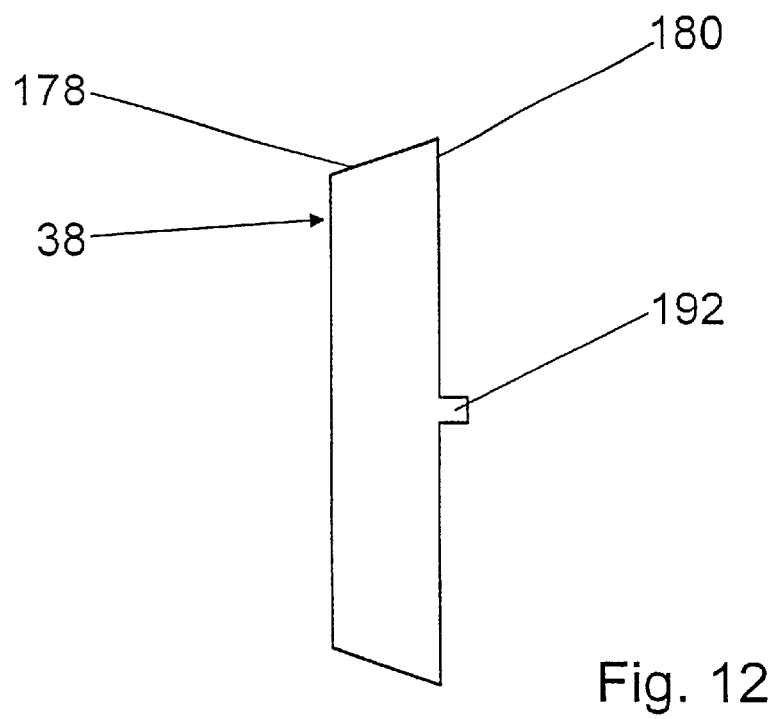
FIG. 12 is a view showing a synthetic plastic ring of FIG. 11 from a side.

In accordance with the present invention the synthetic plastic ring 38 is connected with a transmission housing 24 in both axial directions 170, 172 in a form-locking manner as shown in FIG. 11. The synthetic plastic ring 38 is supported in its mounting direction 170 via an end side 180 against a step 190 in the transmission housing 24. Furthermore, the synthetic plastic ring 38 has an outer cone 178 with a diameter increasing in the mounting direction 170, and the transmission housing 24 has a corresponding inner cone 182 in the region of the synthetic plastic ring 38. Through the cones 178, 182, the synthetic plastic ring is connected opposite to its mounting direction 170 in a form-locking manner with a transmission housing 24. For preventing turning of the synthetic plastic ring 38 during the operation, a web 192 which extends in an axial direction is formed on the end side 190 facing in the mounting direction 170. It engages in not shown recesses of the transmission housing 24 shown in FIG. 12. The synthetic plastic ring 38 is mounted in time prior to the bearing 32 and is compressed in the radial direction.

Figure 13:
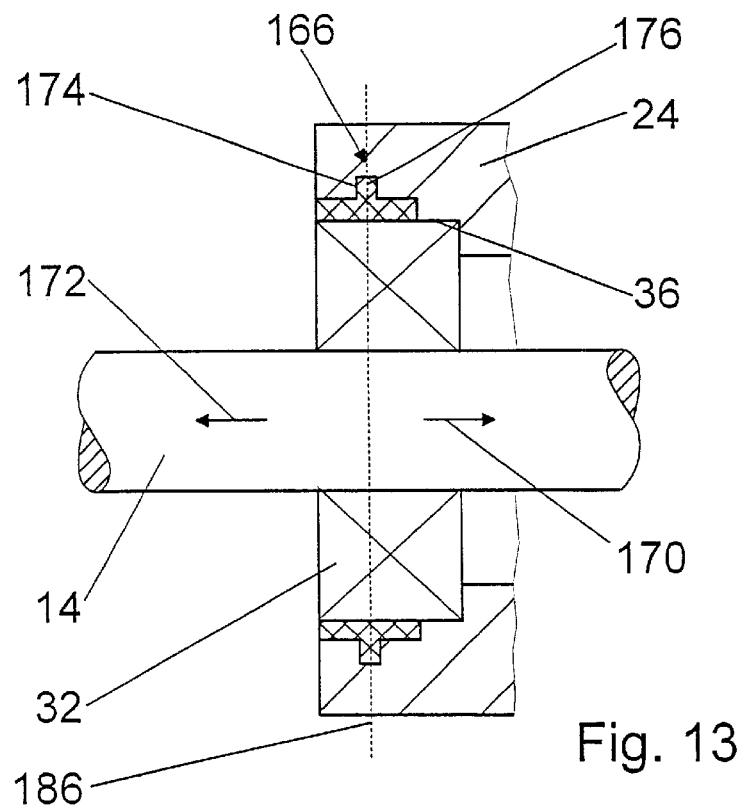
FIG. 13 is a view showing a variant of FIG. 1 with a stepped synthetic plastic ring.

FIG. 13 shows an alternative synthetic plastic ring 166 with a collar 176 extending in a radial direction and over a whole periphery. Substantially identical components of the embodiment examples are identified with the same reference numerals. The collar 176 is arranged centrally, so that the synthetic plastic ring 166 is symmetrical to its axial central plane 186, and during the mounting can be inserted with both end sides first into the transmission housing 24. A faulting mounting is avoided. The collar 176 engages in a recess 174 of the transmission housing 24 and fixes form-lockingly the synthetic plastic ring 166 in both axial directions 170, 172.

Figure 14:
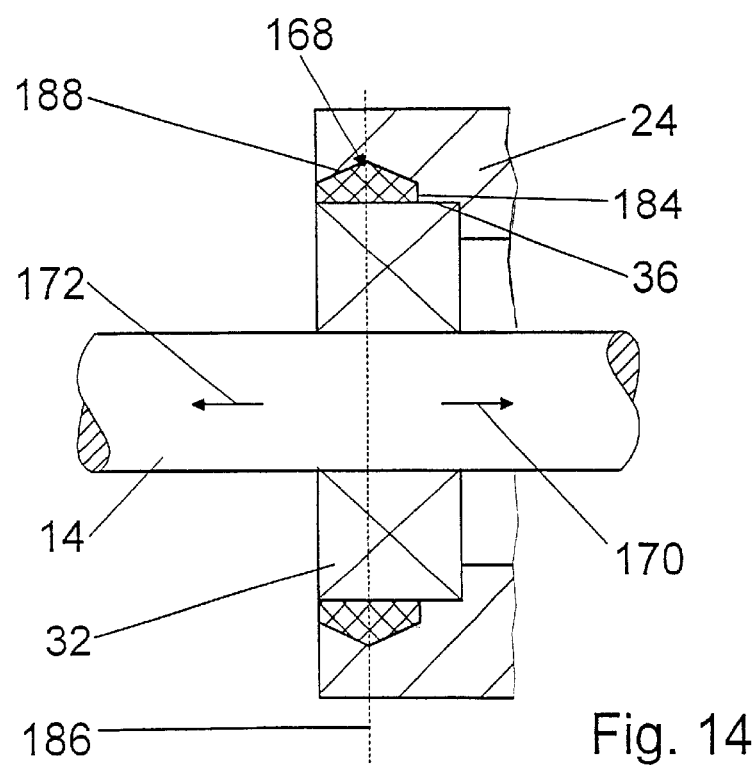
FIG. 14 is a view showing a variant of FIG. 11 with a synthetic plastic ring having a double cone.

In an embodiment shown in FIG. 14, a synthetic plastic ring 168 has a double cone 188 with which a correspondingly formed inner cone 184 in the transmission housing 24 cooperates. The synthetic plastic ring 168 is fixed in both axial directions 170, 172 form-lockingly in the transmission housing 24. The double cone 188 has a diameter increasing to a central plane 186 and thereby can be displaced before the mounting of the bearing 32 simply into the transmission housing 24. The synthetic plastic ring 168 is automatically compressed in a radial direction by the inclines of the double cone 188 facing in the mounting direction 170, by an axial mounting force. The synthetic plastic ring 168 is formed symmetrically to its axial central plane 186, whereby a faulty mounting is avoided.

The driven shaft 18 at its first end facing the insert tool 120 is supported with a first bearing 30 directly. It is also supported with its second end facing the insert 212 with a second bearing 46 in the transmission housing 24 through a bearing bushing formed as an adjusting member 44.

Figure 6:
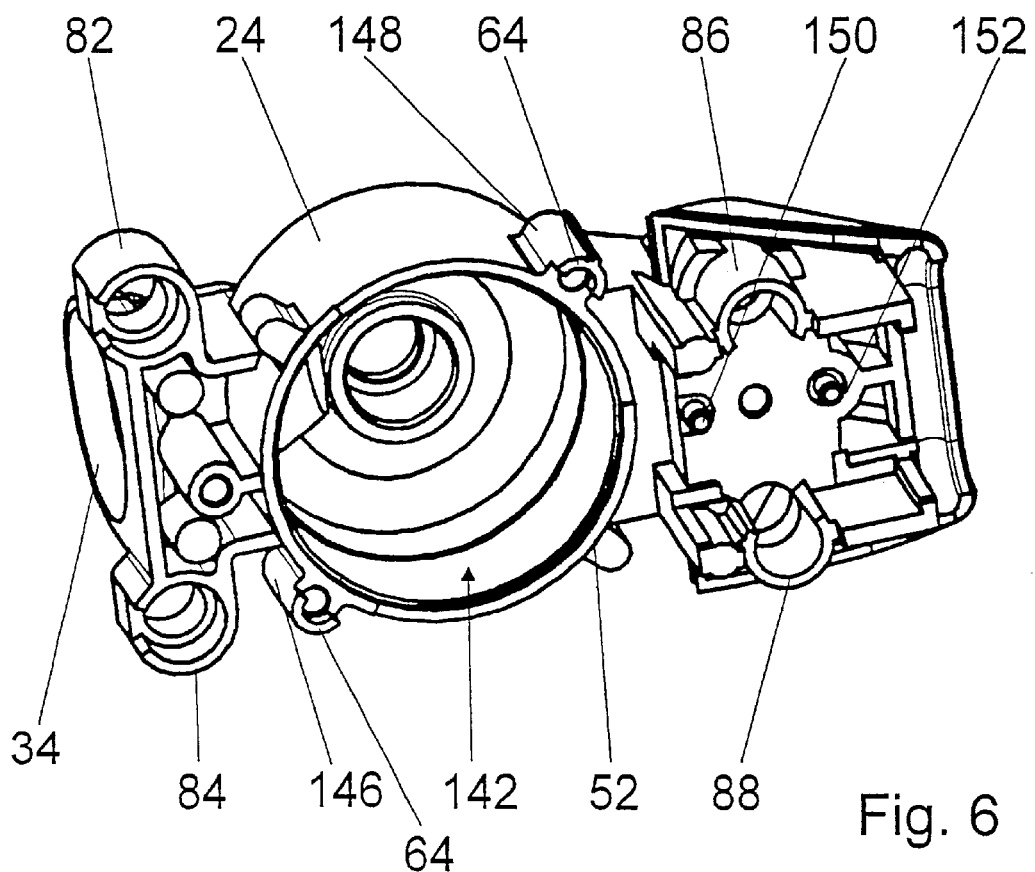
FIG. 6 is a view showing a transmission housing inclined and from below.

The adjusting member 44 is supported through a bearing surface 70 in a cylindrical recess 142 in the transmission housing 24 as shown in FIGS. 1,4,5,6,9, and 10. The adjusting member 44 has a ring wedge 50 on an axial surface 48 of a formed collar 122 facing away from the insert tool 122. The ring wedge 50 is arranged in the housing-side opposite ring wedge 52 as a supporting surface. The ring wedge 50 is pressed by two screws 54, 56 against the opposite ring wedge 52. The screws act with their screw heads 58, 60 on a corresponding clamping surface 62 of the adjusting member 44 and the abutment surfaces 64 of the transmission housing 24 which are formed by webs. For avoiding a 180° turned mounting of the adjusting member 44, the covered angle 144 from the first screw. 54 to the second screw 56 or from a first screw dome 146 to a second screw dome 148 is not equal to 180° as shown in FIGS. 2 and 6.

The clamping surface 62 has a raise or a fall in a peripheral direction and thereby compensates an axial adjusting path of the adjusting member 44. Therefore the screw heads 58, 60 in the adjusting position always act on the clamping surface 62 and on the abutment surface 64. The clamping surface 62 is formed by the steps 66 which extend in the adjusting position parallel to the abutment surfaces of the screw heads 58, 60.

By loosening the screws 54, 56 and turning the adjusting member 44, the driven shaft 18 can be displaced axially and thereby the transmission gap can be adjusted. For avoiding an undesired turning during the operation, a turning safety member 68 is formed on the collar 122 of the adjusting member 44. It is formed by depressions, with which the completely turned-in screws 54, 56 form-lockingly engage in the adjusting direction. In the region of the collar 122, a not shown projection material remains after the machining of the bearing surface 70. It extends in the mounted condition of the adjusting member 44 into an undercut 72 of the transmission housing 24. Furthermore, in the region of the bearing surface 70 a not shown groove is provided for a sealing in the adjusting member 44 and/or in the transmission housing 24. It improves good sealing action provided by long bearing surface 70 and avoids penetration of lubricant from the transmission housing 24 outwardly.

Figure 8:
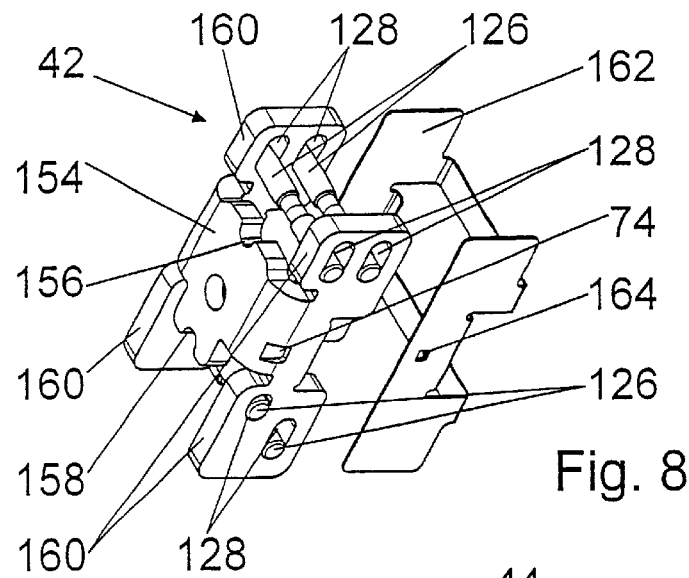
FIG. 8 is a view showing the guiding bearing of the inventive hand power tool inclined and from above.
Figure 9:
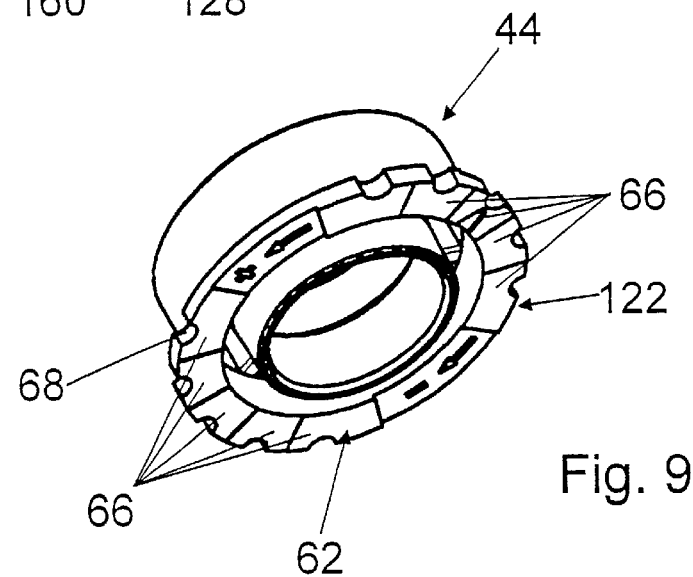
FIG. 9 is a view showing an adjusting element of the inventive hand power tool inclined and from below.
Figure 10:
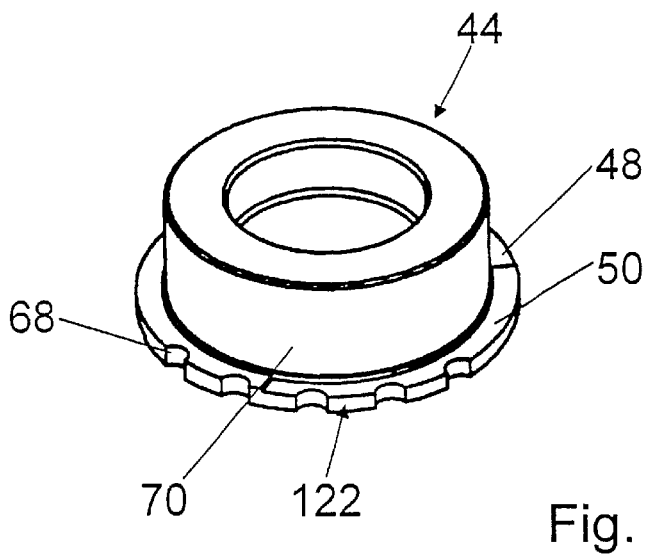
FIG. 10 is a view showing an adjusting member of the inventive hand power tool inclined and from above.

A U-shaped guiding bearing 42 for the insert tool 112 is mounted on the transmission housing 24 in a front region 26 by a screw 124 shown in FIGS. 3 and 8. Pins 150, 152 formed on the transmission housing 24 engage in mounting condition form-lockingly into recesses 156, 158 of a top side 154 of the guiding bearing 42 as shown in FIGS. 6 and 8. The guiding bearing 42 which is produced in a punching-bending process of a hardened steel metal plate is supported with end side 160 of its leg against the transmission housing 24. The guiding bearing 42 is thereby connected in a form-locking and force-transmitting member with the transmission housing 24, and a post-machining of the bearing surfaces or abutment surfaces 160 of the guiding bearing 42 after the punching-bending process can be avoided. In addition, the driver element 22 is non-rotatably guided between the legs of the U-shaped bearing 42 as shown in FIG. 2.

The insert tool 112 is displaceably supported in a longitudinal direction in the guiding bearing 42, in a wear-resistant manner through four rolling bodies 126 formed as needles. They are guided in longitudinal openings 128 and held by a holding plate 162 before the mounting of the guiding bearing 42 non-releasably on the transmission housing 24. The holding plate 162 is engageable in the U-shaped guiding bearing 42 with the formed projections 164 in the recesses 74.

The hand power tool is sealed in direction of the working region by a protective cap 130 with a felt seal 132. The protective cap 130 is form-lockingly inserted between transmission housing 24 and the cover 28. The transmission housing 24 and the cover 28 engage between two circumferential beads of the protective cap 130. The protective cap 130 is thereby mounted especially simply and is connected with the hand power tool in especially wear-resistant manner. The insert tool 112 extends outwardly through the protective cap 130. The protective cap 130 is protected from wear or rubbing against the surface to be machined by the cover 28 and thereby the transmission housing 24.

For changing the insert tool 112, the driver element 22 can be displaced by the push button 110 along the eccentric pin 20 against a pressure spring 136, which is supported in a depression 138 on the adjusting member 44. The pin 1 14 is displaced from the longitudinal opening 16 of the insert tool 112, whereby it can be removed without a tool and an alternative insert tool can be utilized.

Figure 7:
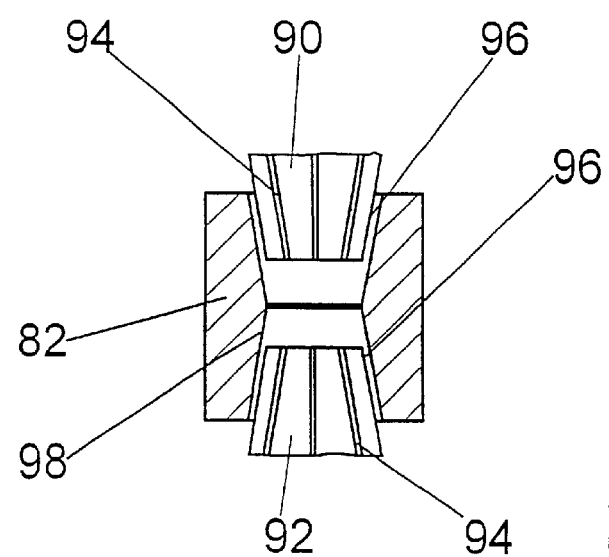
FIG. 7 is a view showing the section through the sleeve of the hand power tool during mounting.

The housing 10, in addition to the first upper housing shell 70, has also a second lower synthetic plastic shell 80. They are assembled in a horizontal working position in a horizontal separation plane 140 as shown in FIG. 2. Four sleeves 82, 84, 86, 88 are formed on the transmission housing 24. From above, four pins 90 of the upper housing shell 78 are inserted in the sleeves in a form-locking and force-transmitting manner, as shown in FIGS. 2, 6 and 7. Furthermore, from below tool pins 92 of the lower housing shell 80 can be inserted into two sleeves 82, 84 which faces away from the insert tool 112, and two pins of the cover 28 can be inserted into the sleeves 86, 88 which face toward the insert tool 112, in a form-locking and force-transmitting manner. The pins 90, 92 of the housing shells 78, 80 and the pins of the cover 28 are formed by screw domes, through which the housing shell 78, 80, the cover 28 and the transmission housing 24 are screwed by not shown screws. The housing shell 80 engages through tool pins 78 formed by two sprue points, form-lockingly in two not shown openings of the cover 28.

In order to avoid a chip-removing post-treatment and to increase the force transmission, the sleeves 82, 84, 86, 88 are each provided with a double inner cone 98 in which the pins 90, 92 of the housing shells 78, 80 and the pins of the cover 28 with correspondingly shaped counter outer cones 96 are inserted. Furthermore, transverse ribs 94 are formed on the pins 90, 92. Thereby the pins 90, 92 can match to the sleeves 82, 84, 86, 88, and an especially advantageous force-transmitting and form-locking connection can be obtained.

It will be understood that each of the elements described above, or two or more together, may also find a useful application in other types of constructions differing from the types described above.

While the invention has been illustrated and described as embodied in hand power tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hand power tool, comprising a housing; a motor arranged in said housing and having a drive shaft with two opposite ends; bearings each supporting one of said ends of said drive shaft in at least one component; an insert tool; a drive element through which said drive shaft is operatively connected with said insert tool, at least one of said bearings of said drive shaft being supported on said component over one part of its length in a radial direction through a sliding seat, and also being supported on said component over another part of its length In the radial direction through a synthetic plastic ring, wherein a first of two outer edges of said bearing is supported on said component and a second of said two outer edges is supported by said synthetic plastic ring.

2. A hand power tool as defined in claim 1, wherein said synthetic plastic ring is form-lockingly connected with said component at least opposite to its mounting direction.

3. A hand power tool as defined in claim 2, wherein said synthetic plastic ring is fixedly connected at least opposite to its mounting direction over a periphery in a form-locking manner.

4. A hand power tool as defined in claim 3, wherein said synthetic plastic ring has at least one outer cone with a diameter increasing in a mounting direction, said component having a corresponding inner cone.

5. A hand power tool as defined in claim 1, wherein said synthetic plastic ring and said component are form-lockingly connected by at least one collar which extends in an axial direction and engages in a recess.

6. A hand power tool as defined in claim 1, wherein said synthetic plastic ring is formed symmetrically to its axial central plane.

7. A hand power tool as defined in claim 1, wherein said synthetic plastic ring has at least one double cone.

8. A hand power tool as defined in claim 7, wherein said double cone of said synthetic plastic ring has a diameter which increases in an axial direction toward a central plane of said synthetic plastic ring.

9. A hand power tool as defined in claim 1, wherein said synthetic plastic ring is connected with said component in a peripheral direction in a form-locking manner.

10. A hand power tool as defined in claim 1, wherein said component is formed by a transmission housing.

11. A hand power tool as defined in claim 10, wherein said bearing of said drive shaft is inserted in a cup-shaped opening of said transmission housing.

12. A hand power tool as defined in claim 10, wherein transmission housing is composed of metal.

13. A hand power tool as defined in claim 10, wherein said transmission housing forms at least a part of said housing in a front region.

14. A hand power tool as defined in claim 1, wherein said bearing of said drive shaft is fixed at least in an axial direction through a housing part.

15. A hand power tool as defined in claim 1, wherein said bearing is supported on said component over approximately one-third of its length in a radial direction through said sliding seat and wherein said bearing is supported over approximately two-thirds of its length in the radial direction through said synthetic plastic ring.

* * * * *